United States Patent

Gorenshtein

(10) Patent No.: US 10,635,407 B2
(45) Date of Patent: Apr. 28, 2020

(54) IDENTIFICATION OF DIFFERENCES BETWEEN SCRIPTS FOR TESTING APPLICATIONS

(71) Applicant: ENTIT Software LLC, Sunnyvale, CA (US)

(72) Inventor: Gennady Gorenshtein, Sunnyvale, CA (US)

(73) Assignee: MICRO FOCUS LLC, Santa Clara, CA (US)

( * ) Notice: Subject to any disclaimer, the term of this patent is extended or adjusted under 35 U.S.C. 154(b) by 0 days.

(21) Appl. No.: 15/765,919

(22) PCT Filed: Oct. 8, 2015

(86) PCT No.: PCT/US2015/054663
§ 371 (c)(1),
(2) Date: Apr. 4, 2018

(87) PCT Pub. No.: WO2017/062008
PCT Pub. Date: Apr. 13, 2017

(65) Prior Publication Data
US 2018/0285082 A1 Oct. 4, 2018

(51) Int. Cl.
G06F 9/44 (2018.01)
G06F 8/30 (2018.01)
G06F 9/455 (2018.01)
G06F 11/36 (2006.01)

(52) U.S. Cl.
CPC ............ G06F 8/31 (2013.01); G06F 9/45512 (2013.01); G06F 11/3688 (2013.01)

(58) Field of Classification Search
CPC ..... G06F 8/31; G06F 8/40; G06F 8/41; G06F 11/36

USPC ................................ 717/115–118, 124–129
See application file for complete search history.

(56) References Cited

U.S. PATENT DOCUMENTS

| | | | |
|---|---|---|---|
| 5,812,436 A * | 9/1998 | Desgrousilliers ... | G06F 11/3692 702/108 |
| 6,539,538 B1 * | 3/2003 | Brewster ................. | H04M 3/51 379/10.03 |
| 6,701,514 B1 * | 3/2004 | Haswell .............. | G06F 11/3664 707/999.102 |
| 7,552,424 B1 * | 6/2009 | Bischof ................. | G06F 11/006 714/36 |

(Continued)

FOREIGN PATENT DOCUMENTS

| CN | 101247292 | 8/2008 |
|---|---|---|
| CN | 103218289 A | 7/2013 |

OTHER PUBLICATIONS

Nivas, "Test Harness and Script Design Principles for Automated Testing of Non-GUI or Web Based Applications ", ACM, pp. 30-37 (Year: 2011).*

(Continued)

*Primary Examiner* — Anil Khatri

(57) ABSTRACT

According to examples, a system and method may identify differences in scripts for testing applications. Particularly, a processor may receive results of a replay of multiple scripts. Each script of the multiple scripts may include information relating to activities between at least one client device and at least one server device over a network. The results may be compared, and based on the comparison, a difference between the scripts may be identified.

20 Claims, 4 Drawing Sheets

(56) References Cited

U.S. PATENT DOCUMENTS

| | | | | |
|---|---|---|---|---|
| 7,730,461 | B2* | 6/2010 | Chamberlain | G06F 11/3684 717/125 |
| 7,840,944 | B2* | 11/2010 | Brunswig | G06F 11/3688 714/38.1 |
| 8,151,276 | B2* | 4/2012 | Grechanik | G06F 11/3414 717/115 |
| 8,185,877 | B1* | 5/2012 | Colcord | G06F 9/44 717/124 |
| 8,196,112 | B1* | 6/2012 | Cansizlar | G06F 16/9577 717/126 |
| 8,291,387 | B2* | 10/2012 | Pal | G06F 11/3688 703/21 |
| 8,365,147 | B2* | 1/2013 | Grechanik | G06F 9/45512 717/124 |
| 8,490,056 | B2* | 7/2013 | Lau | G06F 11/368 706/45 |
| 8,561,067 | B2* | 10/2013 | Shah | G06F 9/45533 717/126 |
| 8,769,491 | B1* | 7/2014 | Conti | G06F 8/314 709/201 |
| 8,881,105 | B2* | 11/2014 | Quilter, Jr. | G06F 11/3672 714/38.1 |
| 8,918,760 | B2* | 12/2014 | Augustin | G06F 11/3684 717/115 |
| 9,311,224 | B1* | 4/2016 | Cohen | G06F 11/3688 |
| 9,317,404 | B1* | 4/2016 | Cohen | G06F 11/3684 |
| 9,990,189 | B2* | 6/2018 | Ashok | G06F 8/60 |
| 2011/0145795 | A1 | 6/2011 | Khanapurkar et al. | |
| 2014/0040667 | A1 | 2/2014 | Zemer et al. | |
| 2014/0040868 | A1 | 2/2014 | Gao et al. | |
| 2014/0095931 | A1 | 4/2014 | Sadasivam et al. | |
| 2015/0100502 | A1 | 4/2015 | Woodard | |

OTHER PUBLICATIONS

Daniel et al, "Automated GUI Refactoring and Test Script Repair (Position Paper)", ACM, pp. 38-41 (Year: 2011).*

Kurabayashi et al, "Automatically Generating Test Scripts for GUI Testing" IEEE, pp. 146-150 (Year: 2018).*

Lucca et al, "Testing Web Applications", IEEE, pp. 310-319 (Year: 2002).*

Grechanik et al, "Maintaining and Evolving GUI-Directed Test Scripts", IEEE, pp. 408-418 (Year: 2009).*

Kristensen et al, "Type Test Scripts for TypeScript Testing", ACM, pp. 1-25 (Year: 2017).*

Balcer et al, "Automatic Generation of Test Scripts from Formal Test Specifications", ACM, pp. 210-218 (Year: 1989).*

Gyori et al, "Reliable Testing: Detecting State-Polluting Tests to Prevent Test Dependency", ACM, pp. 223-233 (Year: 2015).*

Grechanik et al., "Maintaining and Evolving GUI-Directed Test Scripts", IEEE 31st International Conference on Software Engineering 2009, (ICSE' 09), pp. 408-418, May 16-24, 2009).

Gudipati, M., et al., Big Data: Testing Approach to Overcome Quality Challenges, Feb. 19, 2013, Infosys Labs Briefings, vol. 11, No. 1, 9 pages.

International Search Report and Written Opinion dated Jul. 7, 2016, PCT Patent Application No. PCT/US2015/054663 dated Oct. 8, 2015, Korean Intellectual Property Office 13 pages.

Juniper Networks, Inc., Junos Space: Network Application Platform—scripts, Sep. 27, 2011, Release 11.3, 48 pages.

Mercury Interactive, LoadRunner—Creating Vuser Scripts Windows and UNIX, Version 7.51, 2002 (908 pages).

Wikipedia, HP LoadRunner, Sep. 4, 2015 (7 pages).

* cited by examiner

IDENTIFICATION OF DIFFERENCES BETWEEN SCRIPTS FOR TESTING APPLICATIONS

BACKGROUND

Applications (made up of machine-readable instructions) are developed by application developers for execution on systems. Systems on which applications can be run include computers and so forth. Applications can be tested prior to their release.

BRIEF DESCRIPTION OF THE DRAWINGS

Some implementations are described with respect to the following figures.

DETAILED DESCRIPTION

Figure 1:
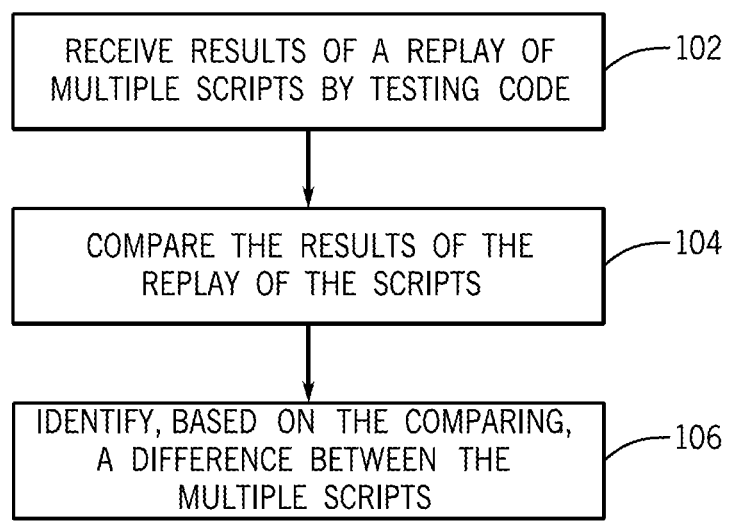
FIG. 1 is a flow diagram of an example process of determining a difference between scripts, in accordance with some implementations.

Prior to release of an application, various tests can be performed of the application. An "application" can refer to any program code (including machine-readable instructions) that is designed to execute on a system, such as any or some combination of the following devices: a personal computer (e.g. desktop computer, notebook computer, etc.), a tablet computer, a smart phone, a wearable device (e.g. smart watch, smart eye glasses, etc.), a server computer, a communication node, a game appliance, a set top box, a television, a vehicle, and so forth.

A type of test that can be performed is referred to as load testing, in which use of an application is simulated in an environment that can include an arrangement of devices that are interconnected by a network. For example, the load testing can simulate many users using (possibly concurrently) the application on respective devices. Load testing can test performance of the application so that any issues (e.g. bottlenecks, faults, errors, etc.) can be identified. Such issues may appear in a client device, a server device, or a network interconnecting the client device and the server device. A "client device" refers to a device that can submit a request to another device, referred to as a "server device." A server device responds to a request with a response.

The load testing allows the environment including the application to be tested under controlled load conditions. In some examples, the environment can include many simulated users (on respective client devices, which can also be simulated) submitting requests to a server device (or multiple server devices). The behavior of the environment including the client devices, the server device(s), and the network can be monitored to determine whether issues arise. Examples of issues can include one or some combination of the following: faults or slow response times of the server device(s); reduced bandwidth of the network; failure to receive responses from the server device(s); and so forth.

An example of a testing tool that can perform load testing is LOADRUNNER® from Hewlett-Packard. In other examples, other types of load testing tools can be employed.

In some examples, load testing can be performed using a script (or multiple scripts). A script includes information relating to activities between devices (e.g. a client device and a server device) over a network. For example, the information can include at least portions of requests sent from the client device to the server device, and responses from the server device to the client device. A script can be generated by recording activities between the client device and the server device over the network. For example, requests, such as Hypertext Transfer Protocol (HTTP) requests, and responses, such as HTTP responses, communicated between the client device and the server device can be logged and included in the script. The logging of the requests and responses can be performed by a monitoring device (sometimes referred to as a "sniffer device") that is coupled to the network between the client device and the server device, or by a monitoring agent (including machine-readable instructions) executed on the client device and/or the server device.

Although reference is made to including information of HTTP requests and HTTP responses in a script, it is noted that in other examples, information of other types of requests and responses, or more generally, other information relating to activities between client and server devices over the network, can be included in a script.

A script (or multiple scripts) can be replayed by the testing tool to simulate the behavior of users interacting with a server device (or multiple server devices). Replaying a script causes activities between client and server devices to be reproduced (simulated), where the activities can include requests and responses communicated between the client and server devices. Performance data (regarding performance of a client device(s), a server device(s), or a network including one or multiple routers or switches in the network) can be monitored to determine performance of the application, the client device(s), the server device(s), and the network.

Over time, an enterprise may accumulate a large number (e.g. hundreds or thousands) of scripts for performing load testing of a particular application. After some time has passed, users of the enterprise may no longer remember what each specific script includes, and how one script differs from another. In some cases, there may be multiple duplicate scripts; in such cases, it may be beneficial to delete all but one of the duplicate scripts. Understanding differences between scripts can also be used for other purposes. For example, a difference between scripts may reveal that a given one of the scripts is missing certain information, such as a uniform resource locator (URL) or other identifier of a resource (e.g. a web document, a web page, etc.) that is to be accessed by the application. This missing URL or other identifier can be manually added to the given script to ensure that the load testing covers the URL or other identifier. In further examples, differences between scripts can be reported to users.

Traditionally, differences between scripts are determined based on manual comparisons of the scripts by one or multiple users. To be able to meaningfully compare scripts, a user would have to understand at some level of detail the load testing tool and the program language of scripts used by the load testing tool. Also, due to the complexity of scripts, some differences may be overlooked in a manual comparison.

In accordance with some implementations of the present disclosure, an automated difference identification tool (which includes machine-readable instructions or a combination of machine-readable instructions and processing hardware) is provided to automatically identify differences between scripts. FIG. 1 is a flow diagram of a process of automated identification of differences between scripts, which can be performed by the difference identification tool. The process receives (at 102) results of a replay of multiple scripts by testing code (e.g. a load testing tool, which can include machine-readable instructions), where each script of the multiple scripts includes information relating to activities between at least one client device and at least one server device over a network. The difference identification tool compares (at 104) the results of the replay of the scripts. The difference identification tool identifies (at 106), based on the comparing, at least one difference between the multiple scripts. Various types of differences between scripts that can be identified are discussed further below.

Figure 2:
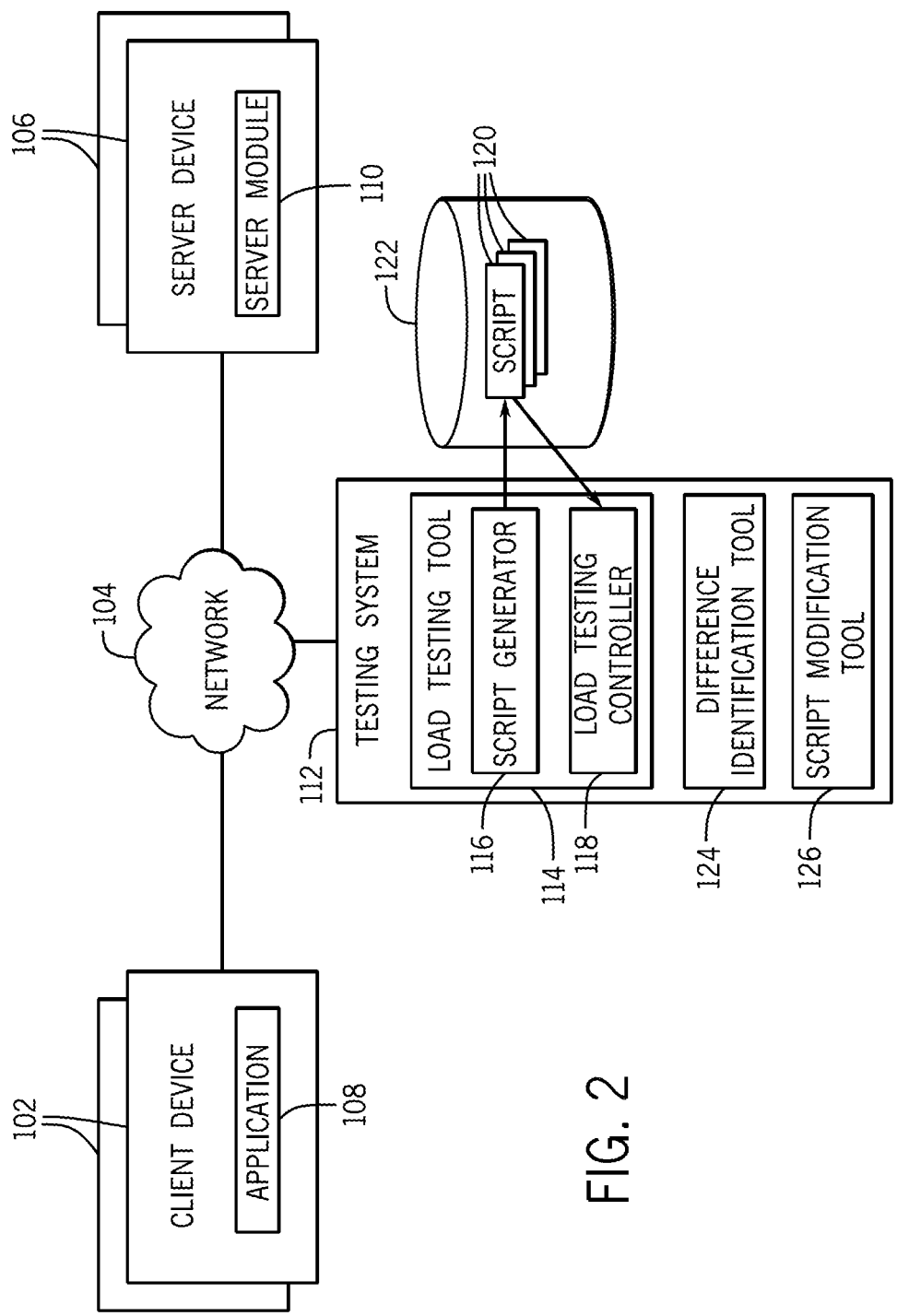
FIG. 2 is a block diagram of an example arrangement including a client device, a server device, and a testing system, in accordance with some implementations.

FIG. 2 is a block diagram of an example arrangement that includes client devices 202 that are interconnected by a network 104 to a server device (or multiple server devices 106).

An application 108, which can include machine-readable instructions, is executable in each client device 102. Execution of the application 108 in a client device 102 causes the client device 102 to interact with a respective server device (or multiple server devices) 106, where each server device can include a server module 110, which can include machine-readable instructions executable on each server device 106 to respond to access by a respective application 108. Examples of the application 108 can include any or some combination of the following: a web application that is executable in a client device 102 to send web requests (such as to access websites) over the network 104 to a server device 106, which responds with a response that is sent back over the network 104 to the client device 102; a database application that can submit database queries to a database server, which responds with requested data; an e-mail application that is able to communicate with an e-mail server; a remote client application that can perform remote login of a server; and so forth.

In examples where the application 108 is a web application, requests from the web application 108 to the server module 110 can include Hypertext Transfer Protocol (HTTP) requests, and responses form the server module 110 to the application 108 can include HTTP responses. In other examples, different types of requests and responses according to different protocols can be communicated between the application 108 and the server module 110.

FIG. 2 further depicts a testing system 112 that is connected to the network 104. The testing system 112 is able to monitor communications between the client devices 102 and the server devices 106.

In some examples, the testing system 112 includes a load testing tool 114, which can include machine-readable instructions executable in the testing system 112. The testing system 112 can include one or multiple computers. In some examples, the testing system 112 can be implemented in one or multiple client devices 102 or in one or multiple server devices 106. Alternatively, the testing system 112 can be implemented in one or multiple computers separate from the client devices 102 and the server devices 106.

The load testing tool 114 includes a script generator 116 and a load testing controller 118. Although specific modules are depicted as being part of the load testing tool 114, it is noted that such modules are provided for purposes of example, as load testing tools according to other arrangements can be provided in other examples.

The script generator 116 can have a recording feature that can record communications between the client devices 102 and the server devices 106. When activated, the recording feature of the script generator 116 can record information relating to activities between the client devices 102 and the server devices 106. For example, the information relating to the activities between the client devices 102 and the server devices 106 can include requests (e.g. HTTP requests or other types of requests) and responses (e.g. HTTP responses or other types of responses) to the requests.

Based on the recorded information, the script generator 116 produces one or multiple scripts 120 that can be stored in a storage device 122. Each script 120 includes information of the recorded requests and responses.

Over time, a large quantity of scripts 120 may be produced by the script generator 116 and stored in the storage device 122. At some point, an administrator or other entity (e.g. code) may wish to understand differences between the scripts 120, or some subset of the scripts 120, to allow for an understanding of such differences and to possibly modify at least one of the scripts 120 based on the identified difference(s).

The load testing controller 118 in the load testing tool 114 is able to control load simulation by replaying a script 120 (or multiple scripts 120). The load testing controller can simulate activities of virtual users based on each script 120. Simulating the activities of the virtual users can involve generating requests based on the information in a script 120, and sending such requests to the server device(s) 106. A virtual user represents an actual user that is using a respective client device 102. Replaying a script 120 allows for the activities of one or multiple users with the server device(s) 106 to be simulated, to place a load on an environment that includes a server device 106 (or multiple server devices) and a network connected to the server device(s) 106.

The load testing tool 114 can include an analysis module (not shown) to monitor performance characteristics during a replay of a script 120, and to record such performance characteristics for an analysis of whether or not an issue has been identified. The monitored performance characteristics can include a response time of a server device 106, whether or not a response was received, a communication time of information through the network 106, and so forth.

A difference identification tool 124, which can include machine-readable instructions, is also executable in the testing system 112. Although the difference identification tool 124 is shown as being part of the testing system 112 that also includes the load testing tool 114, it is noted that in other examples, the difference identification tool 124 can be located on a separate system than the testing system 112 that includes the load testing tool 114.

The difference identification tool 124 can perform tasks of FIG. 1, for example. The difference identification tool 124 can also perform other tasks in other examples, as discussed further below.

In accordance with some implementations, a difference that can be identified by the difference identification tool 124 can be according to one or multiple different levels of differences. As examples, the following levels of differences can be identified:

(1) a difference in uniform resource locators (URLs) accessed in a script 120, where the difference in accessed URLs can refer to either a difference in the text of the URLs or in an order of the URLs;

(2) a difference in a length of a request and/or a response between a client device and a server device;

(3) a difference in payload data inside a request and/or a response.

To identify difference level (1), the difference identification tool 124 can replay a first script and determine a first collection of URLs accessed by the replay of the first script. The difference identification tool 124 can further replay a second script and determine a second collection of URLs accessed by the replay of the second script. The first collection of URLs can be compared to the second collection of URLs, and differences between the text of the URLs and/or order of the accessed URLs can be identified.

To identify difference level (2), the difference identification tool 124 can compare a first request and/or response communicated due to replay of the first script to a second request and/or response communicated due to replay of the second script. A difference in length between the first request and the second request, and/or a difference in length between the first response and the second response, can be identified.

To identify difference level (3), the difference identification tool 124 can compare the payload of a first request and/or response communicated due to replay of the first script to the payload of a second request and/or response communicated due to replay of the second script. A difference between the payload data of the first request and the payload data of the second request, and/or a difference between the payload data of the first response and the payload data of the second response, can be identified. A payload of a request or response refers to the content of the request or response following the header of the request or response.

Although reference is made to several example levels of differences between scripts that can be identified, it is noted that in other examples, other types of differences between scripts can be identified.

The identification of which of the different levels of differences can be based on an adjustable setting. The adjustable setting can be adjustable by a user or other entity (e.g. code). For example, a user interface (e.g. a graphical user interface) can be presented to a user by the difference identification tool 124. The user interface can include a control element that is adjustable by the user to specify one or multiple levels of the different levels of differences to identify. The adjustable setting can also be automatically varied by another entity.

In some implementations, the testing system 112 can further include a script modification tool 126 to modify a script 120 (or multiple scripts 120) based on a difference between scripts 120 identified by the difference identification tool 124. The script modification tool 126 can determine, based on an identified difference between scripts, that a given script 120 should be modified. For example, the script modification tool 126 can determine that the given script 120 is missing a URL or includes an incorrect URL, in which case the script modification tool 126 can modify the given script 120 by adding a URL or changing a URL. As another example, the script modification tool 126 can determine that a request or response in the given script 120 is missing a header or includes an incorrect header, in which case the script modification tool 126 can modify the given script 120 by adding a header to the given script 120 or changing a header in the given script 120.

Figure 3:
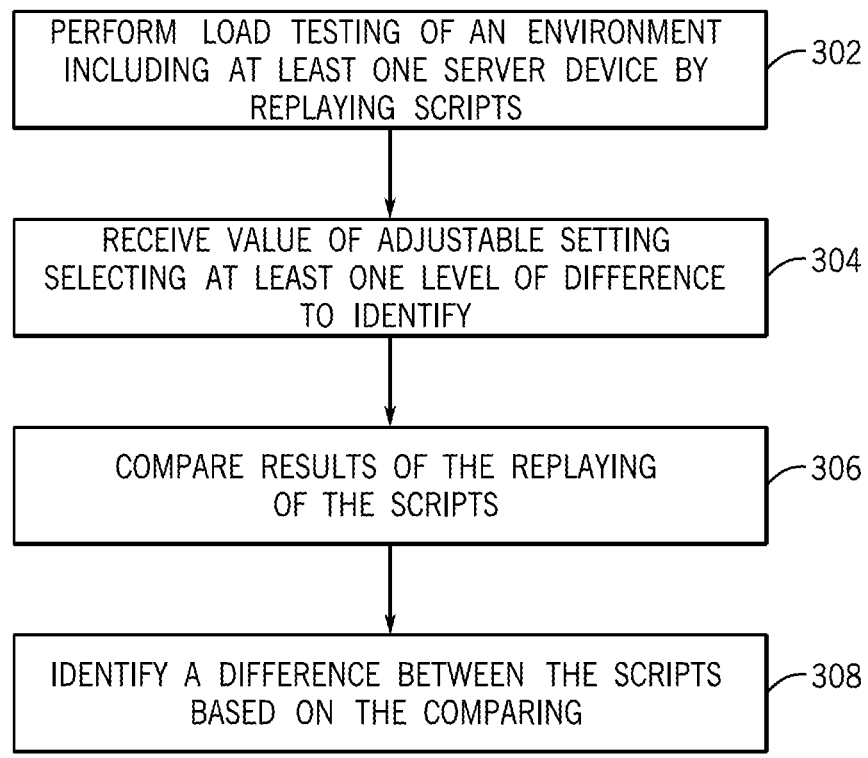
FIG. 3 is a flow diagram of an example process of determining a difference between scripts, in accordance with further implementations.

FIG. 3 is a flow diagram of an example process of the testing system 112 according to further implementations. The load testing tool 114 can perform (at 302) load testing of an environment including at least one server device and a network connected to the at least one server device, by replaying scripts 120 to simulate user access from at least one client device of the at least one server device.

The difference identification tool 124 can receive (at 304) a value of an adjustable setting to specify one or multiple levels of different levels of differences to identify.

The difference identification tool 124 compares (at 306) results of the replaying of the scripts 120 by the load testing tool 114. The difference identification tool 124 identifies (at 308) a difference between the scripts based on the comparing, where the identified difference is a difference of the at least one level of difference selected by the adjustable setting.

Figure 4:
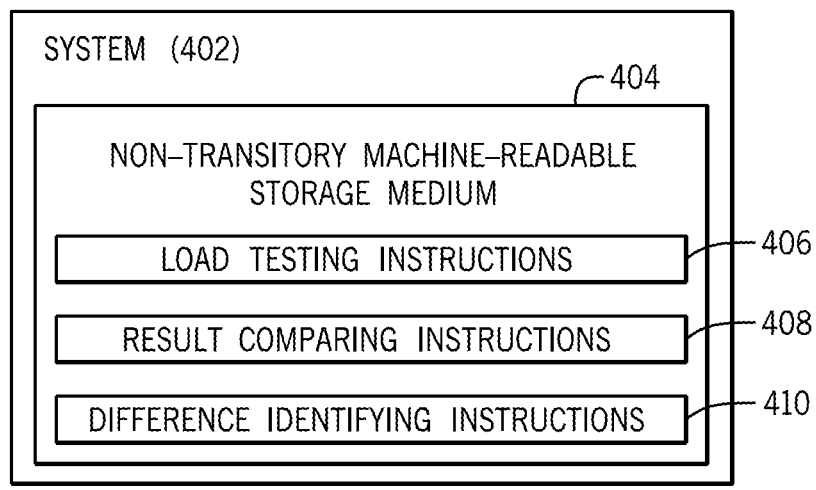
FIGS. 4 and 5 are block diagrams of example systems, in accordance with various implementations.

FIG. 4 is a block diagram of an example system 402 that includes a non-transitory machine-readable storage medium (or storage media) 404 to store various machine-readable instructions. The machine-readable instructions can include load testing instructions 406 to perform load testing of an environment including at least one server device by replaying scripts to simulate user access from at least one client device of the at least one server device. The load testing instructions 406 can be part of the load testing tool 114 of FIG. 2, for example.

The machine-readable instructions further include result comparing instructions 408 to compare results of the replaying of the scripts, and difference identifying instructions 410 to identify a difference between the scripts based on the comparing. The result comparing instructions 408 and the difference identifying instructions 410 can be part of the difference identification tool 124, in some examples.

Figure 5:
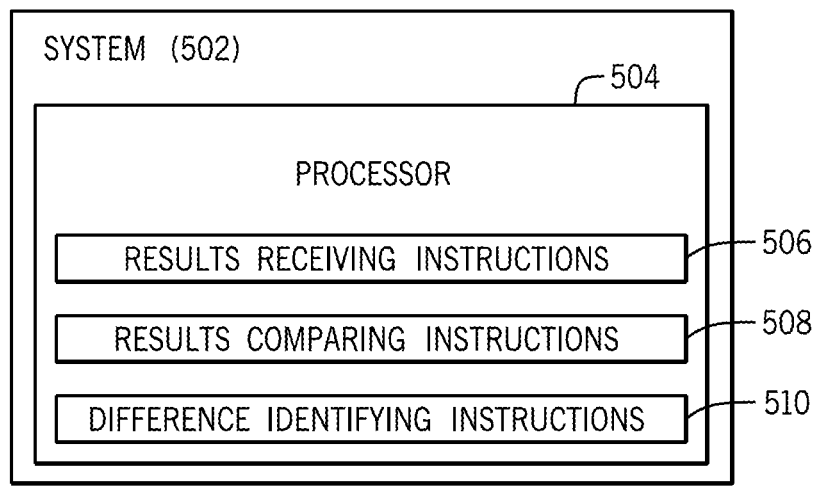

FIG. 5 is a block diagram of an example system 502, according to some implementations. The system 502 includes a processor 504 (or multiple processors 504), which can execute various machine-readable instructions. A processor can include a microprocessor, a microcontroller, a hardware processor module or subsystem, a programmable integrated circuit, a programmable gate array, or any other processing hardware.

The machine-readable instructions executable by the processor(s) 504 include results receiving instructions 506 to receive results of a replay of scripts to simulate operation of an application, results comparing instructions 508 to compare results of the replay of the scripts, and a difference identifying instructions 510 to identify, based on the comparing, a difference between the scripts. The instructions 506, 508, and 510 can be part of the difference identification tool 124 of FIG. 2, for example.

The storage medium (or storage media) 404 of FIG. 4 can include one or multiple different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A method comprising:
   executing, by a processor, instructions to replay a plurality of scripts;
   receiving, by the processor, results of the replaying of the plurality of scripts by testing code, each script of the plurality of scripts comprising information relating to activities between at least one client device to at least one server device and responses from the at least one server device over a network;
   identifying, by the processor, a level of difference among a plurality of levels of differences between the plurality of scripts;
   comparing, by the processor, the results of the replay of the plurality of scripts based on the identified level of difference among the plurality of levels of differences between the plurality of scripts;
   identifying, by the processor based on the comparing, a difference between the plurality of scripts based on the identified level of difference among the plurality of levels of differences between the plurality of scripts; and
   modifying a given script of the plurality of scripts based on the identified difference between the plurality of scripts.

2. The method of claim 1, wherein executing the instructions to replay the plurality of scripts comprises simulating communication of requests and responses between the at least one client device and the at least one server device over the network.

3. The method of claim 1, wherein identifying the level of difference among the plurality of levels of differences comprises identifying a level of difference in an identifier of a resource accessed by the plurality of scripts.

4. The method of claim 1, wherein identifying the level of difference among the plurality of levels of differences comprises identifying a level of difference in an order of accessing identifiers of resources by the plurality of scripts.

5. The method of claim 1, wherein identifying the level of difference among the plurality of levels of differences comprises identifying a level of difference in a length of at least one of a request and a response communicated between the at least one client device and the at least one server device.

6. The method of claim 1, wherein identifying the level of difference among the plurality of levels of differences comprises identifying a level of difference in payload data contained in at least one of a request and a response communicated between the at least one client device and the at least one server device.

7. The method of claim 1, further comprising:
   receiving an adjustable setting relating to at least one selected level of the plurality of levels of differences; and
   wherein identifying the level of difference among the plurality of levels of differences comprises identifying the level of difference based on the received adjustable setting.

8. The method of claim 1, wherein the information relating to activities between the at least one client device and the at least one server device comprises requests from the at least one client device to the at least one server device, and responses from the at least one server device to the at least one client device.

9. The method of claim 1,
   wherein modifying the given script of the plurality of scripts based on the identified difference comprises deleting the given script among the plurality of scripts.

10. The method of claim 1, wherein modifying the given script comprises adding or changing a uniform resource locator (URL) in the given script, or adding or modifying a header of a request or response in the given script.

11. The method of claim 1, further comprising:
    identifying, based on a comparison of the results of the replay of the plurality of scripts, duplicate scripts among the plurality of scripts; and
    removing the duplicate scripts from the plurality of scripts.

12. An article comprising at least one non-transitory machine-readable storage medium storing instructions that, when executed by a processor, cause the processor to:
    replay scripts to perform load testing of an environment including at least one server device, the scripts being replayed to simulate user access from at least one client device of the at least one server device;
    identify a level of difference among a plurality of levels of differences between the scripts;
    compare results of the replaying of the scripts based on the identified level of difference among the plurality of levels of differences between the scripts;
    identify a difference between the scripts based on the identified level of difference among the plurality of levels of differences between the scripts; and
    modify a given script of the scripts based on the identified difference between the scripts.

13. The article of claim 12, wherein, to identify the level of difference among the plurality of levels of differences, the instructions further cause the processor to receive an adjustable setting.

14. The article of claim 13, wherein the plurality of levels of differences comprise:
    a first level associated with a difference in uniform resource locators (URLs) accessed or a difference in an order of URLs accessed,
    a second level associated with a difference in a length of at least one of a request and a response communicated between the at least one client device and the at least one server device, and
    a third level associated with a difference in payload data contained in at least one of a request and a response communicated between the at least one client device and the at least one server device.

15. The article of claim 12, wherein the instructions further cause the processor to:
    identify, based on a comparison of the results of the replaying of the scripts, duplicate scripts among the scripts; and
    remove the duplicate scripts from the scripts.

16. The article of claim 12, wherein, to modify the given script of the scripts based on the identified difference, the instructions further cause the processor to delete the given script among the scripts.

17. A system comprising:
   at least one processor; and
   a non-transitory machine-readable storage medium on which is stored instructions that, when executed by the at least one processor, cause the at least one processor to:
      replay a plurality of scripts to simulate operation of an application, each script of the plurality of scripts comprising information relating to activities between a client device and a server device over a network;
      identify a level of difference among a plurality of levels of differences between the plurality of scripts;
      compare results of the replay of the plurality of scripts based on the identified level of difference among the plurality of levels of differences between the plurality of scripts;
      identify, based on the compared results, a difference between the plurality of scripts based on the identified level of difference among the plurality of levels of differences between the plurality of scripts; and
      modify a given script of the plurality of scripts based on the identified difference between the plurality of scripts.

18. The system of claim 17, wherein the plurality of scripts comprise Hypertext Transfer Protocol (HTTP) requests from the client device to the server device, and HTTP responses from the server device to the client device.

19. The system of claim 17, wherein the instructions further cause the at least one processor to:
   identify, based on a comparison of the results of the replaying of the plurality of scripts, duplicate scripts among the plurality of scripts; and
   remove the duplicate scripts from the plurality of scripts.

20. The system of claim 17, wherein to modify the given script of the plurality of scripts based on the identified difference, the instructions further cause the at least one processor to delete the given script among the plurality of scripts.

* * * * *